United States Patent
Kim et al.

(10) Patent No.: US 7,848,752 B2
(45) Date of Patent: Dec. 7, 2010

(54) SHORT-RANGE WIRELESS COMMUNICATION SYSTEM AND A HANDOFF PROCESSING METHOD THEREFOR

(75) Inventors: Yong-suk Kim, Daejeon (KR); Won-yong Yoon, Yongin (KR); Kyun-hyon Tchah, Seoul (KR); Doo-seop Eom, Seoul (KR); Won-hee Lee, Seoul (KR); Tae-jin Lee, Suwon (KR); Yang-ick Joo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1694 days.

(21) Appl. No.: 10/748,168

(22) Filed: Dec. 31, 2003

(65) Prior Publication Data

US 2004/0152417 A1 Aug. 5, 2004

(30) Foreign Application Priority Data

Jan. 29, 2003 (KR) .............. 10-2003-0005942

(51) Int. Cl.
*H04W 36/00* (2009.01)
(52) U.S. Cl. .................. 455/436; 455/437; 370/331
(58) Field of Classification Search ............. 455/436, 455/437, 444, 41.2; 370/331
See application file for complete search history.

(56) References Cited

U.S. PATENT DOCUMENTS 5,940,371 A * 8/1999 Mitts et al. ............... 370/236
6,308,238 B1 10/2001 Smith et al.
6,675,015 B1 * 1/2004 Martini et al. ............ 455/436

FOREIGN PATENT DOCUMENTS

| EP | 0-777396 A | 6/1997 |
|---|---|---|
| JP | 2001-339752 A | 12/2001 |
| JP | 2002-111689 A | 4/2002 |
| JP | 2003-8589 A | 1/2003 |

OTHER PUBLICATIONS

Won Hee Lee, et al; Handoff Provisioning in Bluetooth Wireless Personal Area Networks, Internet (www.ieee.org), vol. 49, No. 4 No Nov. 2003, pp. 1004-1012.
Govind Krishnamurthi, et al; Buffer Management for Smooth Handovers in IPv6, Network Working Group Internet Draft, Mar. 1, 2003, pp. 1-26.

* cited by examiner

*Primary Examiner*—Yuwen Pan
(74) *Attorney, Agent, or Firm*—Sughrue Mion, PLLC

(57) ABSTRACT

Disclosed is a handoff processing method capable of restarting fast communications. The handoff processing method stores in a handoff buffer Host Control Interface (HCI) data and transmission data upon communications in a state where an Access Point is interlinked with an external device. Further, the method forwards the HCI data and the transmission data buffered in the handoff buffer to a new Access Point (AP) transmitting a message indicating setup completion of a connection if the message indicating setup completion of a connection with the external device is transmitted from the new AP after a handoff occurs as the external device moves. Accordingly, throughputs are not lowered despite handoff occurrences in poor wireless channel environments, so that service quality can be enhanced.

16 Claims, 7 Drawing Sheets

TIME(s)
(TIMEOUT OF A LINK SUPERVISION TIME=2 SECONDS,
LINK-MAINTAINING TIME=4 SECONDS)

(TIMEOUT OF A LINK SUPERVISION TIME=2 SECONDS,
LINK-MAINTAINING TIME=4 SECONDS)

SHORT-RANGE WIRELESS COMMUNICATION SYSTEM AND A HANDOFF PROCESSING METHOD THEREFOR

This application claims the priority of Korean Patent Application No. 2003-5942, filed on Jan. 29, 2003, in the Korean Intellectual Property Office, the disclosure of which is incorporated herein in its entirety by reference.

BACKGROUND OF THE INVENTION

1. Field of the Invention

The present invention relates to a short-range wireless communication system, and more particularly to a short-range wireless communication system for processing handoffs as mobile terminals move and a handoff processing method therefor.

2. Description of the Prior Art

The short-range wireless communication system such as the Bluetooth, which performs communications by using the Time Division Duplex (TDD) scheme, is designed in order for an Access Point (AP) connected to the base network (wired/wireless) to serve as a master, and for each mobile terminal to serve as a slave. At this time, if a mobile terminal recognizing an AP as a master is moving into a different wireless range, it is necessary to automatically switch a current communication channel of the mobile terminal into a different communication channel for the different wireless range. Such communication channel switches according to the movements of a mobile terminal are referred to as handoffs, which can be stated as a very important function in the short-range wireless communication system.

The conventional short-range wireless communication system generally uses the hard handoff referred to as the break-before-make handoff that breaks an existing communication channel before a new communication channel is made, to thereby enable link re-establishments.

However, the hard handoff algorithm has a problem of taking a somewhat long time for the link re-establishments after a handoff occurs, so diverse methods for overcoming the problem have been proposed recently.

There are three typical approaches as follows for solving the time delay problem in re-establishing a link when a handoff occurs.

First, there is the technology of Access Point Roaming (APR) proposed by the Bluetooth Special Interest Group (Bluetooth SIG)(Reference material: Bluetooth SIG, PAN Access Point Roaming, Rev 0.51, June, 2002). APR is the technology in which neighboring Access Points (APs) share information on mobile terminals to re-establish a link via only page scan procedures without an inquiry scan. For the APR technology, there exists the Personal Area Network User (PANU) mode by which the handoff starts and the Network Access Point (NAP) mode by which the handoff starts, wherein the occasion that the handoff is triggered by the PANU is referred to as the requested handoff and the occasion that the handoff is triggered by the NAP is referred to as a forced handoff. In both of the modes above, the mobile terminal inquiry information is transferred to neighboring APs at the time that the mobile terminals are disconnected with each other and a link with only page scan procedures is re-established without an inquiry scan.

FIG. 1 is a view for showing signal flows when a handoff is triggered by a PANU in the APR. The handoff is triggered by a Blue Network Encapsulation Protocol (BNEP) handoff message from the PANU to the AP(NAP B)(refer to (1) of FIG. 1), and, if the AP(NAP B) is disconnected at the link layer (refer to (2)), the AP(NAP B) transfers in the wired manner an Inter NAP Communication (INC) message including the inquiry information of the mobile terminal (PANU) to neighboring NAPs (NAP A and NAP C), and requests paging to the NAPs at the same time (refer to (3)). Thereafter, the neighboring APs (NAP A and NAP C) serving as a master have the inquiry information of the mobile terminal (PANU), so that they skip the inquiry scan procedures and immediately perform the paging procedure (refer to (5)), and, at this time, the mobile terminal (PANU) as a slave continuously performs the page scan (refer to (4)). Further, if a new connection is completely established between the mobile terminal (PANU) and the AP (NAP C) (refer to (6)), the newly connected AP (NAP C) transfers an acknowledge message INC_ACK ($BD\_ADDR_{PANU}$) to neighboring APs (NAP A and NAP B) through wires (refer to (7)). The neighboring APs that have received the acknowledge message abort attempts to make a connection with the mobile terminal, and then the AP newly connection-established with the mobile terminal creates and configures a new baseband connection through the Link Manager Protocol (LMP) (refer to (8)), and sets up a Blue Network Encapsulation Protocol (BNEP) connection with the Logical Link Control and Adaptation Protocol (L2CAP) (refer to (9)).

FIG. 2 is a view for showing signal flows when a handoff occurs by an NAP in the APR. If a handoff occurs by an NAP, a BNEP handoff request message is initiated at the NAP (refer to (11)) and a disconnection response is performed in the NAP (refer to (12)), which is different from FIG. 1 in which the handoff is triggered by the PANU. The subsequent operations have the same signal flows.

As another example for the conventional handoff processing method, there is the Indirect-Transmission Control Protocol (I-TCP) proposed by A. Barke and B. R. Badrinath (Reference material: "I-TCP: Indirect TCP for Mobile Hosts", in Proc. Of the 15th IEEE ICDC, May 1995). I-TCP is a handoff processing protocol that completely splits the TCP connection between the Correspondent Host (CH) and the mobile terminal into the wired TCP connection and the wireless TCP connection to protect the wired TCP connection from problems occurring in the wireless TCP connection so that the TCP congestion does not occur.

As yet another example for the conventional handoff processing method, there is the Bluetooth TCP Booster (BTB) proposed by D. Melpignano and D. Siropaes (Reference material: "Bluetooth TCP Booster", in Proc. Of IEEE VTC, pp. 2167-2141, 2001). The BTB is installed between the AP layer-2 Bluetooth and the layer-3 IP, which is a handoff processing approach that monitors TCP downstreams, estimates an average arrival time of upstream ACK packets, and, if the ACK packet arrival is delayed compared to the estimated time, sends a fake ACK resizing the reception window size to zero to prevent the TCP downstreams transmitted from a Correspondent Host. That is, the BTB estimates the average arrival time of the ACK packets by using a local timer, so that the ACK packets do not arrive within the estimated time if a handoff occurs. At this time, the BTB sends to the Correspondent Host the fake ACK resizing the reception window size to zero instead of a mobile terminal, and the Correspondent Host decides the fake ACK is a normal ACK and prevents the TCP downstreams, so that a data loss does not occur during handoff. However, the data loss cannot be avoided that occurs between the time when a mobile terminal passes a wireless cell boundary and the time when a handoff is triggered.

However, in the above conventional handoff methods, the APR has a problem of poor service quality since it has still the unsolved TCP exponential backoff due to the data loss during handoff which is another problem of the hard handoff. That is, when using the handoff scheme of the APR, it is difficult, under the environments having bad wireless channel characteristics, to set up fast connections that are advantageous to the fast handoff scheme of the APR; thus, the TCP exponential backoff occurs due to downstream data loss during handoff, causing a problem of decreasing the TCP data throughput even though a link is re-established.

Further, the existing TCP has to be modified for the I-TCP, and the I-TCP splits the TCP connection into the wireless connection and the wired connection, so that an AP between the wireless and wired connections has to be provided with all the wireless and wired TCP stacks. Accordingly, the I-TCP slows down its processing speed, which may be a waste with respect to resource utilization. Further, there may exist a bottleneck region between the split wireless and wire connections, which causes a problem of delaying smooth flows of the entire network.

Further, in the BTB, an agent located on the layer 2.5 manages the layer-4 TCP and ACK packets, which causes a problem-violating the layering concept. Moreover, if there occurs a handoff in a state that the data processed by the BTB agent processes and completely transmits some parts of multiple baseband packets consisting of Internet Protocol (IP) packets, the IP packet is received from the beginning in the communications with a new AP, causing a problem of increasing overhead with respect to the Bluetooth. Further, in the current TCP mechanism, the BTB is an approach that transmits ACK packets one by one every time the TCP segments are received one by one rather than an approach transmitting ACK packets in use of a timer, so that it has a problem that an AP can not generate ACK packets for triggering communications due to blocked TCP streams.

SUMMARY OF THE INVENTION

In order to solve the above problems, one aspect of the present invention provides a short-range communication system and a handoff processing method therefor capable of preventing the lowering of throughputs even though handoffs occur in poor wireless channel environments so that the deteriorations of service quality can be prevented.

In order to achieve the above-described aspect of the invention, a short-range wireless communication system according to the present invention comprises a host controller interface provided with a handoff buffer for buffering Host Controller Interface (HCI) data and transmission data, and for exchanging the data with an external device; a microcontroller for forwarding to a new Access Point (AP) the data buffered in the handoff buffer if a message indicating setup completion of a connection with the external device is transmitted from the new AP after a handoff occurs as the external device moves, in a state where the new AP is interlinked with the external device.

Here, the handoff buffer, when applied to a Bluetooth system, uses a baseband buffer provided in the HCI for data re-transmission. Further, the handoff buffer buffers the data by baseband packet unit. Further, when the handoff buffer is applied to the Bluetooth system, the connection setup completion message with the external device that is transmitted from the new AP is recognized by reception of an INC_ACK message.

The microcontroller deletes the data buffered in the handoff buffer if an ACK for the data transmitted from the external device is received, and maintains the data buffered in the handoff buffer if not received. When applied to the Bluetooth, the ACK for the data transmitted to the external device is recognized through reception of a baseband ACK signal.

In the meantime, if the microcontroller newly linked with a third external device receives HCI data and transmission data from a different AP, the microcontroller transmits the HCI data and the transmission data to the third external device immediately.

In order to achieve the above object, a handoff processing method for a short-range wireless communication system according to the present invention comprises steps of storing in a handoff buffer HCI data and transmission data upon communications with an external device, in a state where a new Access Point is interlinked with the external device; and forwarding to the new AP the HCI data and the transmission data buffered in the handoff buffer if a message indicating setup completion of a connection with the external device is transmitted from the new AP after a handoff occurs as the external device moves.

The handoff buffer, when applied to the Bluetooth, uses a baseband buffer provided for data re-transmission, and stores the data by baseband packet unit.

Further, the handoff processing method for a short-range wireless communication system further comprises steps of deleting the data buffered in the handoff buffer if an ACK for the data transmitted from the external device is received, and maintaining the data buffered in the handoff buffer if the ACK for the data transmitted from the external device is not received.

Further, the handoff processing method for a short-range wireless communication system further comprises a step of, if receiving the HCI data and transmission data from a different AP in a state of being newly linked with a third external device, immediately transmitting the HCI data and the transmission data to the third external device.

As described above, in the short-range wireless communication system and the handoff processing method therefor, since the system forwards to the newly linked AP the data buffered after handoff completion even though a handoff occurs in a state that wireless channel environments are worsened, the newly linked AP can immediately transmit the forwarded data to a mobile terminal even though the link-disconnected time for the mobile terminal is lengthened so as to prevent the TCP exponential backoff.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Hereinafter, the present invention will be described in detail with reference to the accompanying drawings.

Figure 1:
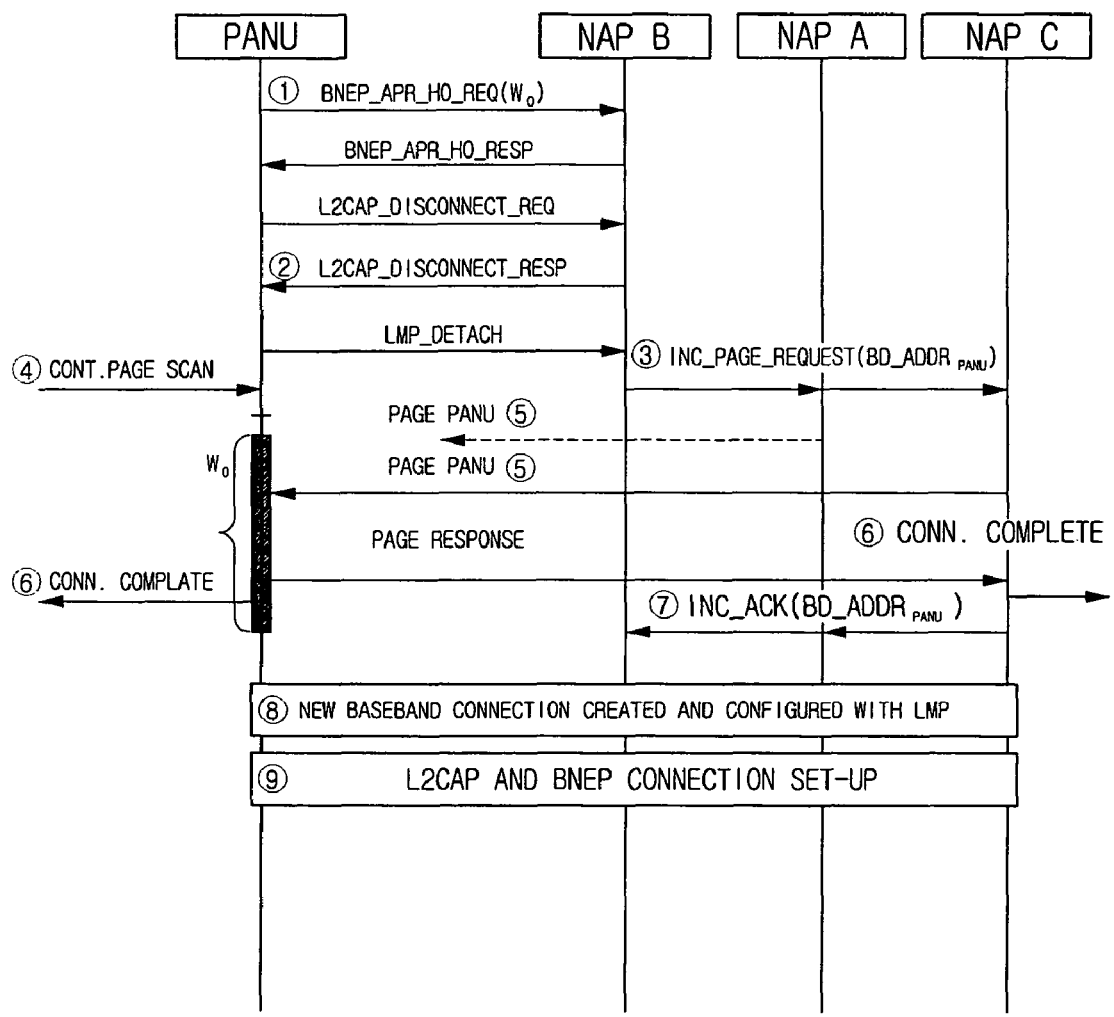
FIG. 1 and FIG. 2 are views for showing signal flows for a conventional APR-based handoff process according to the kind of device making a handoff.
Figure 2:
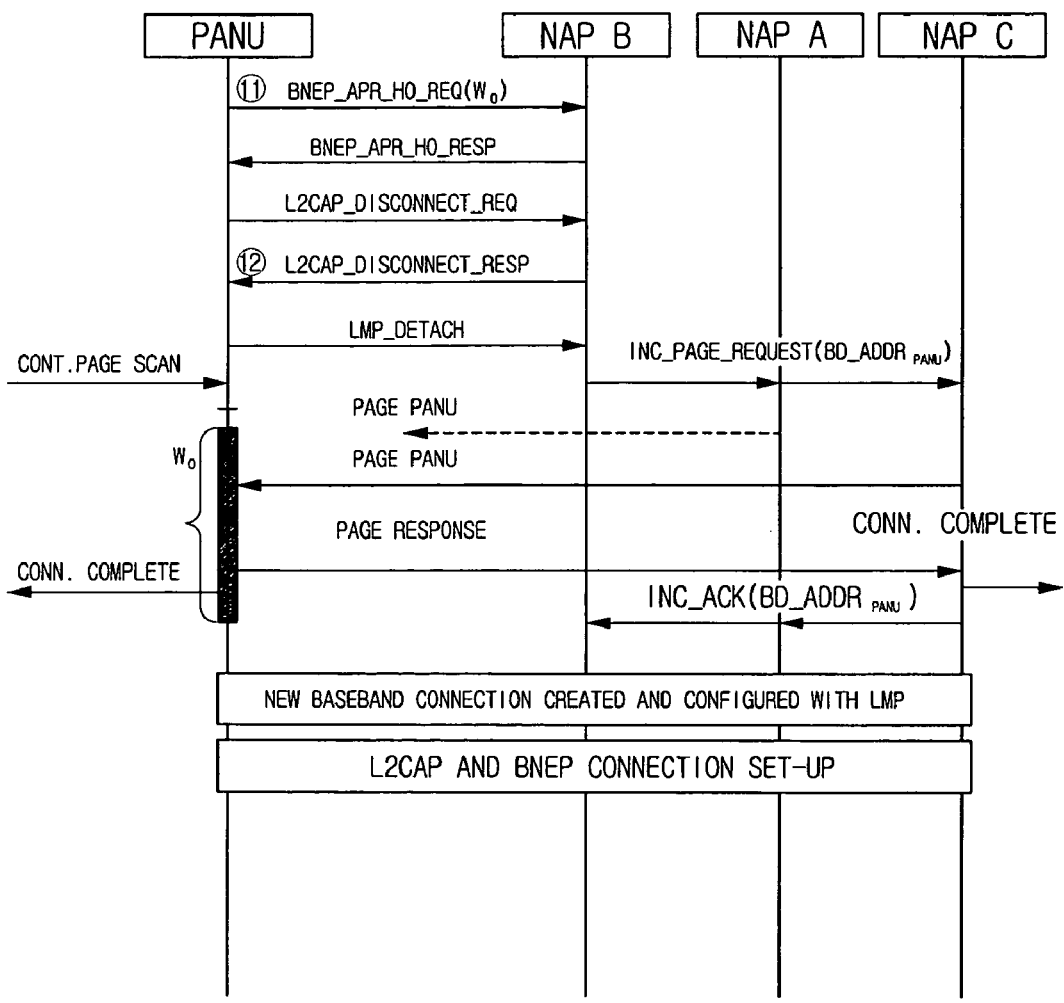
Figure 3:
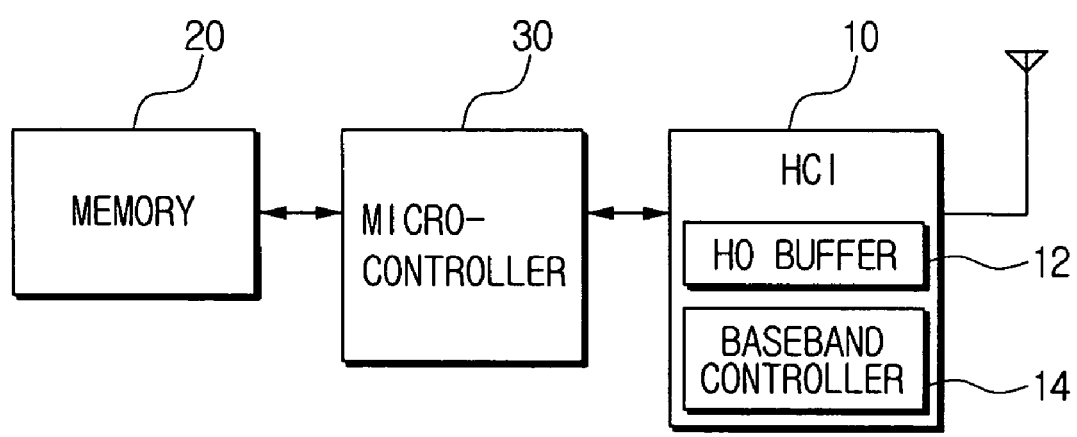
FIG. 3 is a block diagram for showing a short-range wireless communication system applied to a Bluetooth system according to an embodiment of the present invention.

FIG. 3 is a schematic block diagram for showing a short-range wireless communication system according to an embodiment of the present invention. Here, the short-range wireless communication system is shown with a system, for example, that is used in the Bluetooth system. The system includes a host controller interface (HCI) 10, a memory 20, and a microcontroller 30.

The HCI 10 has a handoff buffer 12 for buffering HCI data and transmission data, and a baseband controller 14 for controlling a linked mobile terminal and a data interface. Here, the handoff buffer 12 is placed on a HCI layer of the Bluetooth system, and, for the handoff buffer 12, a baseband buffer is used that buffers transmission data for data retransmission when the data retransmission is required from a mobile terminal. Unlike the above, a separate buffer can be used.

The memory 20 stores protocols predetermined based on respective layers so that data can be exchanged among mobile terminals and different APs.

The microcontroller 30 controls the overall system, and, in particular, controls the HCI to continuously maintain data packets buffered in the handoff buffer 12 if a handoff occurs as a linked mobile terminal moves, and, if a signal indicating the completion of a connection with a mobile terminal making the handoff is transferred from a new AP after completing the handoff, forwards to the new AP the data packets buffered in the handoff buffer.

Figure 4:
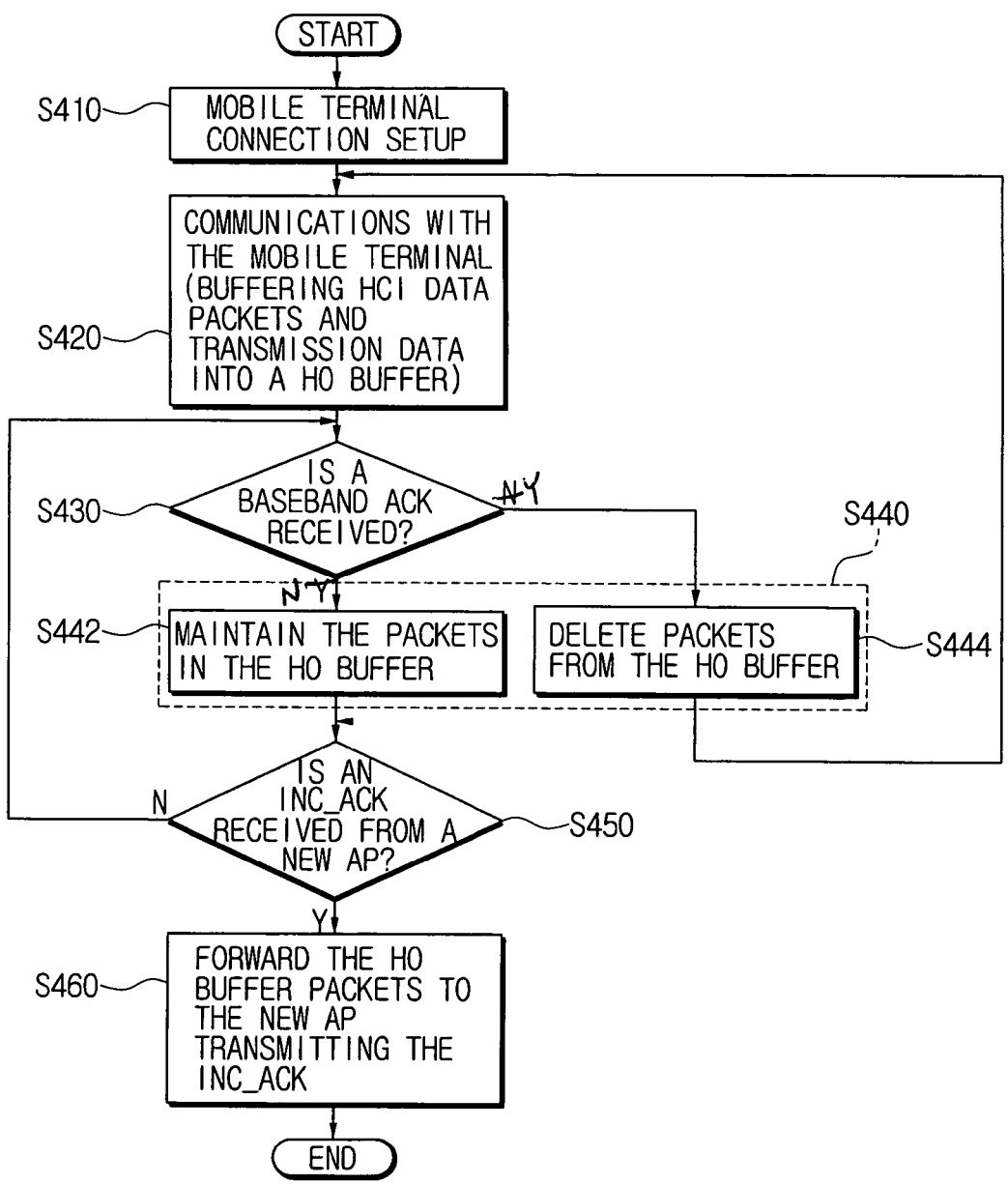
FIG. 4 is a flow chart for explaining a handoff processing method for the short-range wireless communication system of FIG. 3.

FIG. 4 is a flow chart for explaining a handoff processing method for the short-range wireless communication system of FIG. 3. The system can perform communications with a mobile terminal if a connection with the mobile terminal is set up (S410), and, when performing communications with the mobile terminal, the microcontroller 30 instructs the baseband controller 14 to buffer into the handoff buffer (or a baseband buffer) 12 and transfer HCI data and transmission data to be transmitted to the mobile terminal (S420).

As described above, the system performs communication with the mobile terminal while buffering data packets in the handoff buffer 12, the microcontroller 30 controls the HCI to delete or keep the packets buffered in the handoff buffer (S440) according to whether a baseband ACK signal transmitted from the mobile terminal is received (S430). That is, the microcontroller 30 instructs the baseband controller 14 to delete the packets buffered in the handoff buffer 14 when receiving the baseband ACK signal from the mobile terminal (S444), and enables continuous communications to be performed while sequentially buffering to-be-transmitted data packets into the handoff buffer 12. If the baseband ACK signal is not received within an estimated time from the mobile terminal, the microcontroller 30 instructs the baseband controller 14 to continuously maintain the packets buffered in the handoff buffer 12 (S442).

Figure 5:
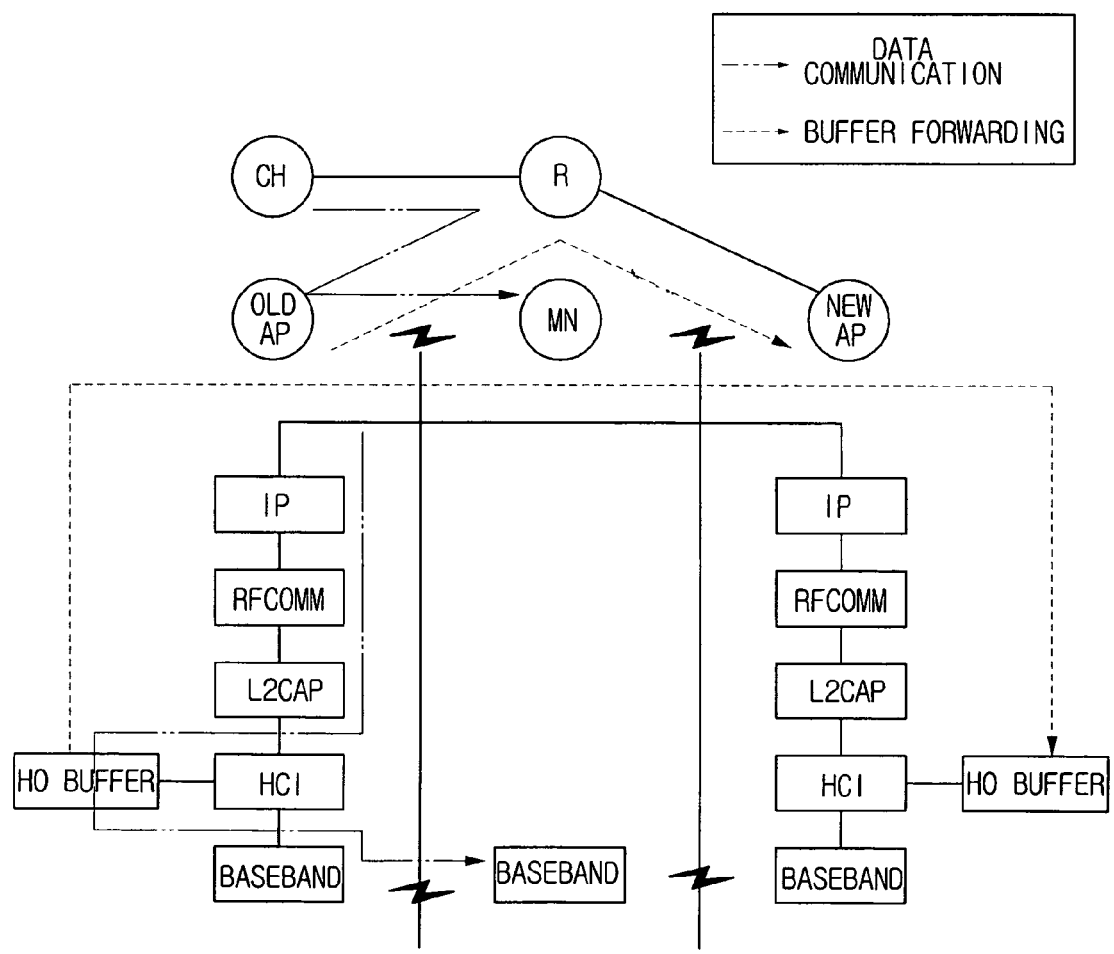
FIG. 5 is a view for showing forwarding procedures for the short-range wireless communication system of FIG. 3 together with Bluetooth system layers.

In the meantime, if the baseband ACK signal is not received from the mobile terminal with a handoff occurring, the microcontroller 30 does not delete, but maintains the packets buffered in the handoff-buffer 12 (S442). That is, the system does not receive the baseband ACK signal any more, even when a handoff occurs, so that the microcontroller 30 does not delete, but maintains the packets buffered in the handoff buffer 12. Thereafter, if the mobile terminal sets up a new connection with a different AP and an INC_ACK signal of handoff completion and link re-establishment is transmitted from the new AP (S450), the microcontroller 30 forwards the data packets buffered in the handoff buffer to the new AP that transmits the INC_ACK message (S460). FIG. 5 is a view for showing forwarding procedures from an old AP of a mobile terminal to a new AP, together with Bluetooth system layers. In FIG. 5, a reference numeral CH denotes a Correspondent Host, a reference numeral R denotes a router, and a reference numeral MN denotes a mobile node.

Through the above forwarding procedures, packets buffered in the handoff buffer of an old AP are transmitted to a new AP, the new AP transmits the received packets immediately to the mobile terminal.

If data packets are transmitted to the mobile terminal from the new AP, the mobile terminal does not recognize the forwarding from the old AP to the new AP, so that the mobile terminal sends to a Correspondent Host CH an ACK signal requesting the next packets.

As described above, it can be stated that transmitting the ACK signal from the mobile terminal to the new AP brings out a result that the communications between the mobile terminal and the new AP restart with an active request of the mobile terminal rather than the host, and that the data transmission without data loss based on forwarding, enables fast communication restarts since the TCP exponential backoff does not occur.

Further, since the packets of the handoff buffer are the baseband packets used for the layer 2 in the Bluetooth system, a buffer size can be reduced compared to a buffer used for the layer 3, and receiving packets can be prevented from disorder, so that the duplication of receiving packets can be effectively reduced.

Figure 6:
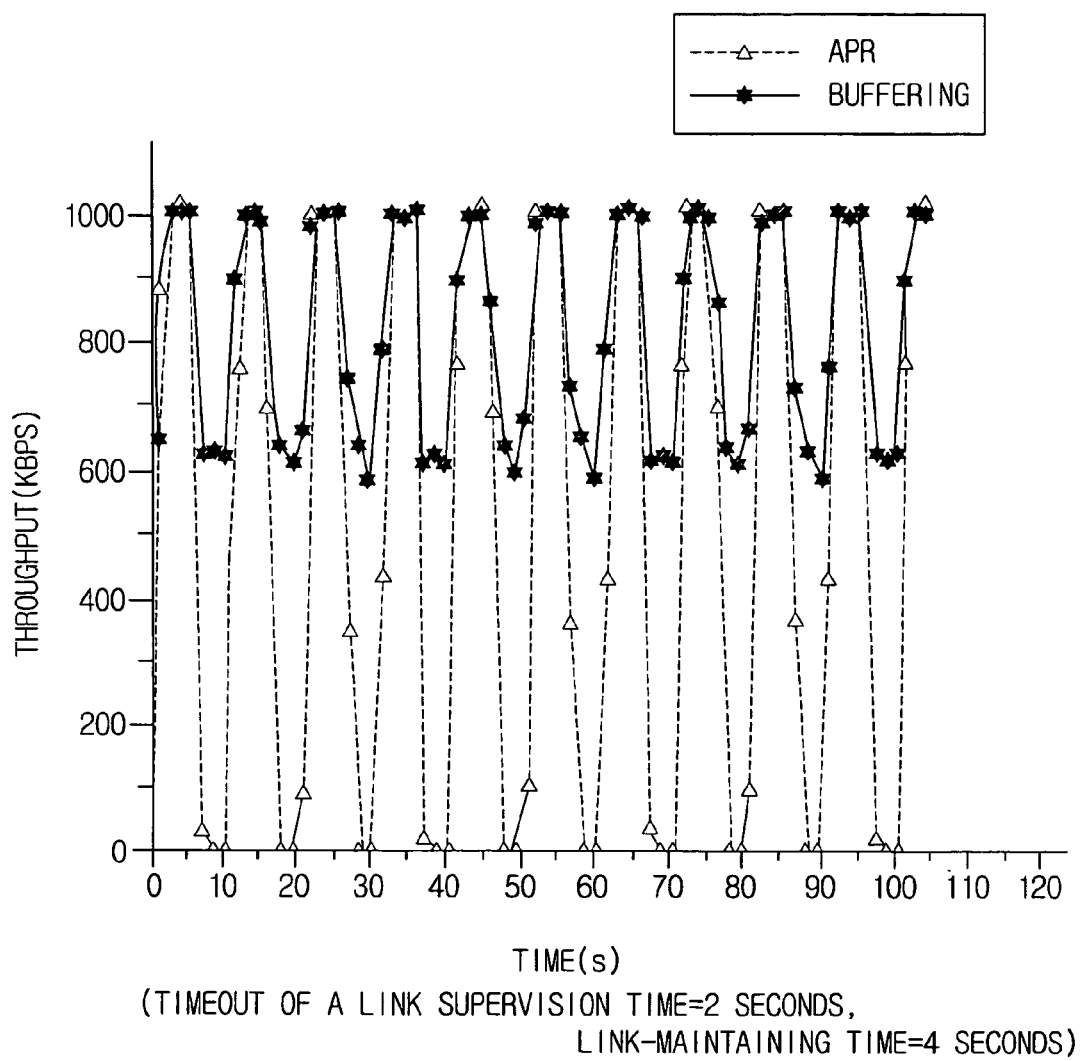
FIG. 6 and FIG. 7 are views for comparing performances based on the frequency of handoffs upon the present handoff process and the conventional APR-based handoff process in the Bluetooth system, and for comparing buffering performances based on the order of received packets.
Figure 7:
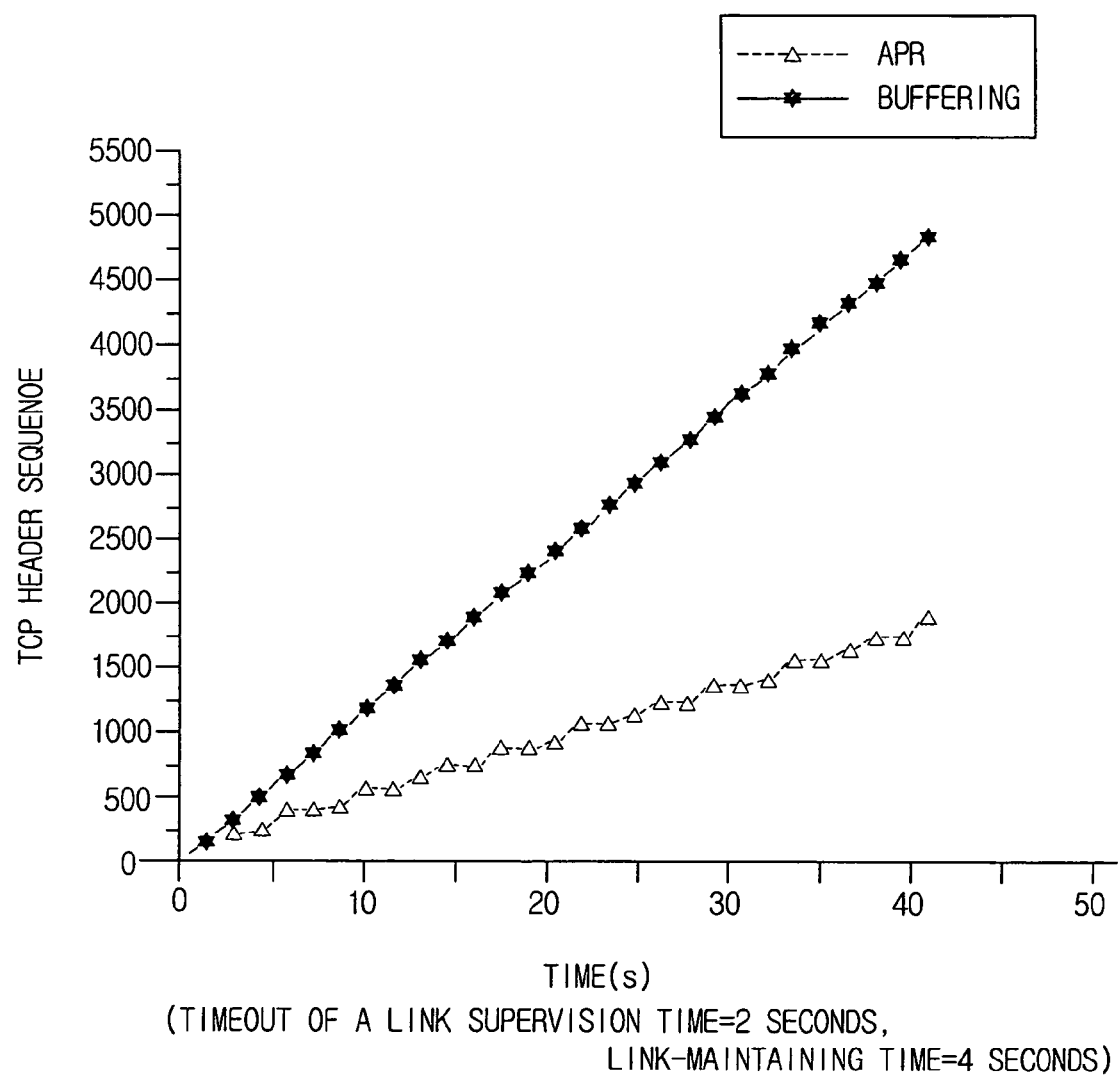

FIG. 6 and FIG. 7 are views for comparing throughputs based on the present handoff process and the conventional APR-based handoff process in a Bluetooth system, wherein FIG. 6 is a view for showing a performance comparison based on the frequency of handoffs, and FIG. 7 is a view for showing a layer-2 buffering performance comparison based on the order of received packets.

The simulations shown in FIG. 6 and FIG. 7 has been obtained under assumption that a moving speed of a mobile terminal is 1.2 m/s, a radius of a piconet is 10 m, a mobile terminal moves in one direction and passes a point of 60% of the piconet diameter. A timeout value of a link supervision timer is set to two seconds to detect a fast link loss, and handoffs are made twelve times with a substantial communication time of four seconds only maintained for the worst occasion in consideration of circumstances having poor wireless channel characteristics.

FIG. 6 shows a comparison between the present layer-2 packet buffering scheme and the conventional APR-based fast handoff scheme in environments frequently switching on and off communications due to poor wireless channel characteristics. The APR-based handoff scheme has intervals lowering throughputs with TCP exponential backoffs occurring due to packet losses during link disconnection times despite link re-establishments with the handoffs completed. However, since the proposed layer-2 packet buffering scheme of the present invention immediately restarts communications through forwarded data packets when the handoffs are completed with link re-established, the TCP exponential backoff occurrence is eliminated, so that throughputs can be continuously obtained as shown.

FIG. 7 shows the order of TCP packets received from a mobile terminal, in which the APR lowers the efficiency with duplicated packets received, but the layer-2 packet buffering scheme of the present invention shows the reception of more packets, so it can be confirmed that the efficiency is enhanced.

As aforementioned, the wireless communication system and the handoff processing method for the wireless communication system according to the present invention can prevent throughputs from lowering due to data losses occurring as a link disconnection time is lengthened when handoffs occur in a state that wireless channel environments are worsened so as to enable fast communication restarts, and the occurrence of TCP exponential backoff is suppressed so as to enhance communication service quality.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A short-range wireless communication system, comprising:
   a host controller interface provided with a handoff buffer for buffering at least one of Host Controller Interface (HCI) data and transmission data, and for exchanging said at least one of HCI data and transmission data with an external device;
   a microcontroller for forwarding to a new Access Point (AP) said at least one of HCI data and transmission data buffered in the handoff buffer if a message indicating setup completion of a connection with the external device is transmitted from the new AP after a handoff occurs as the external device moves, in a state where the new AP is interlinked with the external device.

2. The short-range wireless communication system as claimed in claim 1, wherein the microcontroller deletes said at least one of HCI data and transmission data buffered in the handoff buffer if an acknowledge ACK message for said at least one of the HCI data and the transmission data transmitted from the external device, is received.

3. The short-range wireless communication system as claimed in claim 2, wherein the microcontroller maintains said at least one of HCI data and transmission data buffered in the handoff buffer if the acknowledge ACK message for the data transmitted from the external device, is not received.

4. The short-range wireless communication system as claimed in claim 3, wherein, if the microcontroller newly linked with a third external device receives said at least one of HCI data and the transmission data from a different AP, the microcontroller transmits said at least one of HCI data and the transmission data to the third external device immediately.

5. A handoff processing method for a short-range wireless communication system, comprising steps of:
   storing in a handoff buffer at least one of Host Controller Interface (HCI) data and transmission data upon communications with an interlinked external device in a state where a new Access Point (AP) is interlinked with the external device; and
   forwarding to the new Access Point (AP) said at least one of HCI data and the transmission data buffered in the handoff buffer if a message indicating setup completion of a connection with the external device is transmitted from the new AP after a handoff occurs as the external device moves.

6. The handoff processing method as claimed in claim 5, further comprising a step of deleting said at least one of HCI data and transmission data buffered in the handoff buffer if an acknowledge (ACK) message for said at least one of the HCI data and the transmission data transmitted from the external device, is received.

7. The handoff processing method as claimed in claim 6, further comprising a step of maintaining said at least one of the HCI data and the transmission data buffered in the handoff buffer if the acknowledge (ACK) message for the data transmitted from the external device, is not received.

8. The handoff processing method as claimed in claim 5, further comprising a step of, if receiving said at least one of HCI data and transmission data from a different AP in a state of being newly linked with a third external device, immediately transmitting said at least one of the HCI data and the transmission data to the third external device.

9. A Bluetooth system, comprising:
   a host controller interface provided with a baseband buffer for buffering at least one of Host Controller Interface (HCI) data and transmission data, and for exchanging said at least one of said HCI data and the transmission data with an external device;
   a microcontroller for forwarding to a new Access Point (AP) said at least one of the HCI data and the transmission data buffered in the baseband buffer if an Inter Network Access Point (NAP) Communication (INC) acknowledge ACK message is transmitted from the new AP after a handoff occurs as the external device moves, in a state where the new AP is interlinked with the external device.

10. The Bluetooth system as claimed in claim 9, wherein the microcontroller deletes said at least one of the HCI data and the transmission data buffered in the baseband buffer if a baseband ACK from the external device is received.

11. The Bluetooth system as claimed in claim 10, wherein the microcontroller maintains said at least one of the HCI data and the transmission data buffered in the baseband buffer if the baseband ACK is not received.

12. The Bluetooth system as claimed in claim 9, wherein, if the microcontroller newly linked with a third external device receives said at least one of HCI data and the transmission data from a different AP, the microcontroller transmits said at least one of HCI data and the transmission data to the third external device immediately.

13. A handoff processing method for a Bluetooth system, comprising steps of:
   storing in a handoff buffer at least one of HCI data and transmission data upon communications with an external device, in a state where a new Access Point (AP) is interlinked with the external device; and
   forwarding to the new Access Point (AP) said at least one of the HCI data and the transmission data buffered in the baseband buffer if an INC ACK message is transmitted from the new AP after a handoff occurs as the external device moves.

14. The handoff processing method as claimed in claim 13, further comprising a step of deleting said at least one of the HCI data and the transmission data buffered in the baseband buffer if a baseband acknowledge (ACK) message is received from the external device.

15. The handoff processing method as claimed in claim 14, further comprising a step of maintaining said at least one of the HCI data and the transmission data buffered in the baseband buffer if the baseband ACK message is not received from the external device.

16. The handoff processing method as claimed in claim 13, further comprising a step of, if receiving said at least one of HCI data and transmission data from a different AP in a state of being newly linked with a third external device, immediately transmitting said at least one of the HCI data and the transmission data to the third external device.

* * * * *